(12) United States Patent
Thubert et al.

(10) Patent No.: US 11,784,970 B2
(45) Date of Patent: Oct. 10, 2023

(54) FIRST HOP SECURITY IN MULTI-SITE MULTI-VENDOR CLOUD

(71) Applicant: Cisco Technology, Inc., San Jose, CA (US)

(72) Inventors: Pascal Thubert, Roquefort-les-Pins (FR); Eric M. Levy-Abegnoli, Valbonne (FR); Patrick M. P. Wetterwald, Mouans Sartoux (FR); Jonas Zaddach, Antibes (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 258 days.

(21) Appl. No.: 17/362,485

(22) Filed: Jun. 29, 2021

(65) Prior Publication Data

US 2022/0417213 A1    Dec. 29, 2022

(51) Int. Cl.
    *H04L 9/40*      (2022.01)

(52) U.S. Cl.
    CPC .......... *H04L 63/0209* (2013.01); *H04L 63/12* (2013.01)

(58) Field of Classification Search
    CPC .............................. H04L 63/0209; H04L 63/12
    See application file for complete search history.

(56) References Cited

U.S. PATENT DOCUMENTS

| | | | |
|---|---|---|---|
| 7,035,410 B1 * | 4/2006 | Aiello | H04L 9/3263 380/258 |
| 2011/0035585 A1 | 2/2011 | Haddad | |
| 2011/0219231 A1 * | 9/2011 | Shen | H04L 63/06 713/168 |
| 2013/0291117 A1 * | 10/2013 | Thubert | H04L 45/742 726/26 |
| 2014/0282864 A1 * | 9/2014 | Thubert | H04W 12/122 726/3 |
| 2017/0289138 A1 | 10/2017 | Ben-Shalom et al. | |
| 2017/0324770 A1 | 11/2017 | Thubert et al. | |
| 2020/0186362 A1 | 6/2020 | Thubert et al. | |

OTHER PUBLICATIONS

Amit Kumar et al., "*First Hop Security Considerations in IPV6 Implementation*," National Knowledge Network, National Information Centre, New Delhi, India, pp. 227-235, Jun. 16, 2014.

* cited by examiner

*Primary Examiner* — William S Powers
(74) *Attorney, Agent, or Firm* — Baker Botts L.L.P.

(57) ABSTRACT

The present disclosure is directed to systems and methods for first hop security in a multi-site and multi-vendor cloud. The method may include receiving, at a first hop security (FHS) device located within a defined security perimeter, a message from a first host; validating a security of the message; signing the message with a signature to prove validation of the message, the signature comprising at least a Crypto-ID Parameters Option (CIPO) and a Neighbor Discovery Protocol Signature Option (NDPSO); and transmitting the signed message to one or more network FHS devices within the security perimeter.

20 Claims, 4 Drawing Sheets

FIRST HOP SECURITY IN MULTI-SITE MULTI-VENDOR CLOUD

TECHNICAL FIELD

The present disclosure generally relates to first hop security, and more specifically to systems and methods for first hop security in multi-site and multi-vendor clouds.

BACKGROUND

A subnetwork, also referred to as a subnet, is a logical subdivision of an IP network. Subnetting may enhance routing efficiency or improve network management when administratively controlled by different entities in a larger organization. The scale of an IP subnet has been a challenge due to the amount of broadcast messages that may be sent by each end node, resulting bandwidth, security, and operational issues. One prevalent solution for scaling and securing the subnet is to spread one subnet into multiple "pods," wherein the pods are bridged together over a Layer 3 backbone as a distributed IP link. The backbone is referred to as the "fabric."

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including, receiving, at a first hop security (FHS) device located within a defined security perimeter, a message from a first host; validating a security of the message; signing the message with a signature to prove validation of the message, the signature comprising at least a Crypto-ID Parameters Option (CIPO) and a Neighbor Discovery Protocol Signature Option (NDPSO); and transmitting the message with the signature to one or more network FHS devices within the security perimeter.

Moreover, the operation of validating includes creating a binding state associated with the message. Additionally, the message is signed based on a Crytpo-type associated with the FHS device.

Moreover, signed message may include a shared secret known by the FHS device and the one or more network FHS devices within the security perimeter Furthermore, the operations may further include adding a time stamp to the signed message. The operations may also comprise adding an optional nonce to the signed message.

The operations may also include receiving from at least one of the one or more network FHS devices a second signed message, the second signed message including at least a second CIPO and a second NDPSO.

According to another embodiment, a method may include the steps of receiving, at a first hop security (FHS) device located within a defined security perimeter, a message from a first host; validating a security of the message; signing the message with a signature to prove validation of the message, the signature comprising at least a Crypto-ID Parameters Option (CIPO) and a Neighbor Discovery Protocol Signature Option (NDPSO); and transmitting the message with the signature to one or more network FHS devices within the security perimeter.

According to yet another embodiment, one or more computer-readable non-transitory storage media may embody instructions that, when executed by a processor, cause the performance of operations, including receiving, receiving, at a first hop security (FHS) device located within a defined security perimeter, a message from a first host; validating a security of the message; signing the message with a signature to prove validation of the message, the signature comprising at least a Crypto-ID Parameters Option (CIPO) and a Neighbor Discovery Protocol Signature Option (NDPSO); and transmitting the message with the signature to one or more network FHS devices within the security perimeter.

Technical advantages of certain embodiments of this disclosure may include one or more of the following. The systems and methods described herein may allow FHS devices (i.e., devices equipped with FHS functionality) to be configured to secure a SD Access security perimeter and protect against potential attacks from the trunk in a multi-vendor EVPN (Ethernet Virtual Private Network) cloud. Specifically, the mechanism of the present disclosure enables trusted FHS devices to validate and sign messages that enter the security perimeter on the fly, and send the validated and signed messages to other FHS devices, thereby allowing for trusted environments to be provisioned in a multi-vendor and/or multi-site deployments.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

For the fabric of an IP network, the trust model is critical. Anything entering and circulating within the fabric must be verified. In one trust model, trust may be anchored to either physical or logical access switches or edge nodes. The set of access switches or edge nodes connecting the pods of a subnet together constitute the "security perimeter" and is expected to be very secure. The security that is provided is particularly important when subnet level services are provided centrally to all pods within the same subnet, e.g., a central gateway, a DHCP server, etc.

The challenge arises in instances where one or more access switches or edge devices are outside the security perimeter. This typically happens in heterogenous deployments, wherein certain access switches or edge nodes supporting first hop security (FHS) are able to run security checks on the ingress and others are not. It is difficult to determine whether the latter devices have opened the subnet to vulnerabilities. By enabling multi-vendors deployments, standards such as EVPN Integrated Routing and Bridging (IRB) have dramatically increased the potential for these challenges.

The Internet Engineering Task Force Request for Comments (IETF RFC) 8928 provides for a two-pronged security feature in the IPv6 Neighbor Discovery protocol suite that is configured for use outside the security perimeter: 1) Crytpo-ID Parameters Option (CIPO) that contains the parameters that are necessary for the signature validation; and 2) Neighbor Discovery Protocol Signature Option (NDPSO) that carries the signature. Specifically, the RFC 8928 address validation flow comprises a challenge/response methodology, wherein a router—after receiving a Neighbor Solicitation Extended Address Registration Option (NS (EARO)) message from a host (the host may be, for example, attempting to register an address)—challenges the host with a Neighbor Advertisement (NA) message with a status of "validation requested." The NA message carries a nonce that protects the router against a replay attack by a rogue host and participates to the guarantee that the key is used only once. The host responds with a NS message that carries a CIPO, a NDPSO, and a second nonce. The second nonce is the host's guarantee that the key is used only once. Although the RFC 8928 is useful in various contexts, it cannot be applied in cases requiring security validation of IPv6 ND control packets on the fly without a challenge.

The present disclosure is directed to first hop security in a multi-site and multi-vendor cloud, and more specifically, to systems and methods that secure the software-defined access security perimeter against potential attacks from the trunk in a multi-site and multi-vendor EVPN cloud. In particular, the mechanisms of the present disclosure allow for FHS functionality in a router or switch inside the security perimeter of a subnet, thereby allowing the in-perimeter FHS device to validate the security of a message received from a host and destined for a receiver, and prove the validation via a signed message comprising at least a CIPO and a NDPSO. The signed message may also include a time stamp and optional nonce. In this manner, the receiver may trust the message as if it had performed the checks.

Figure 1:
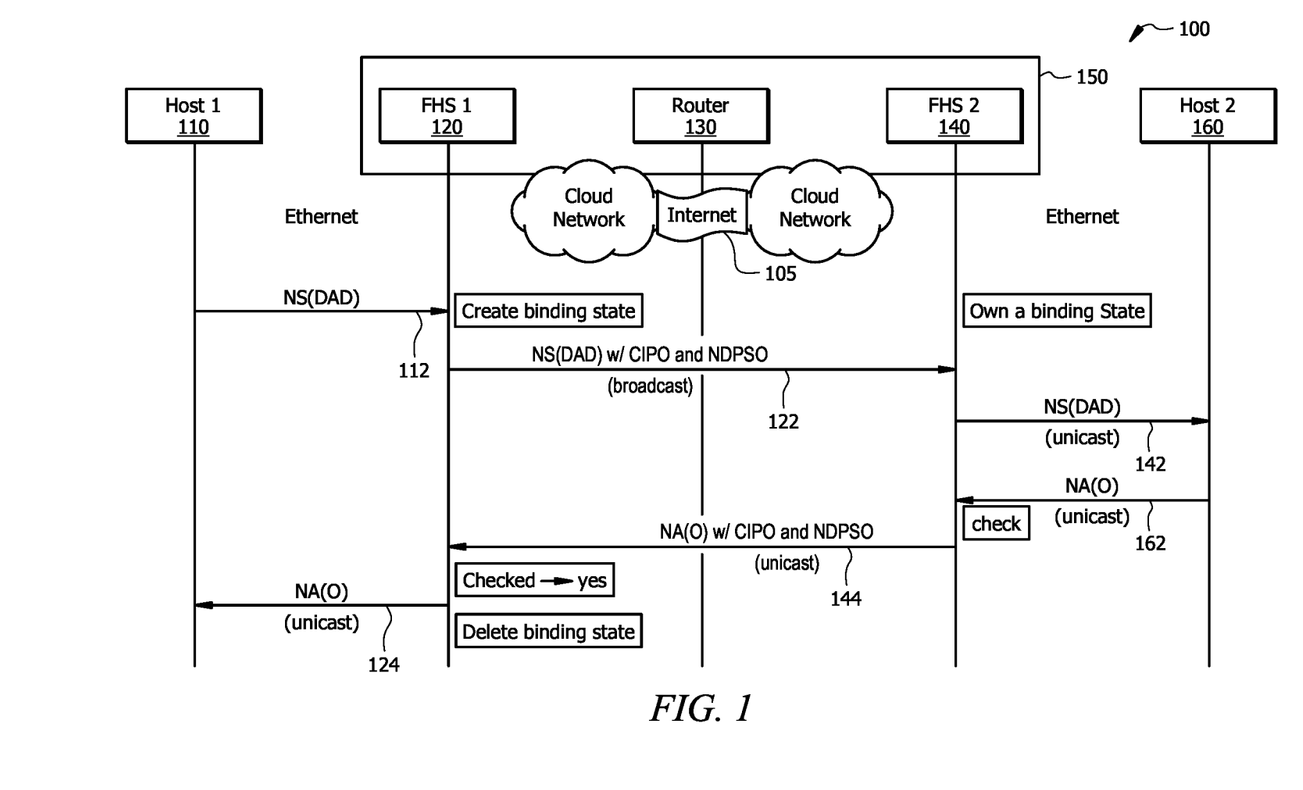
FIG. 1 illustrates a first example use case of a system for first hop security in multi-site multi-vendor clouds, in accordance with certain embodiments.
Figure 2:
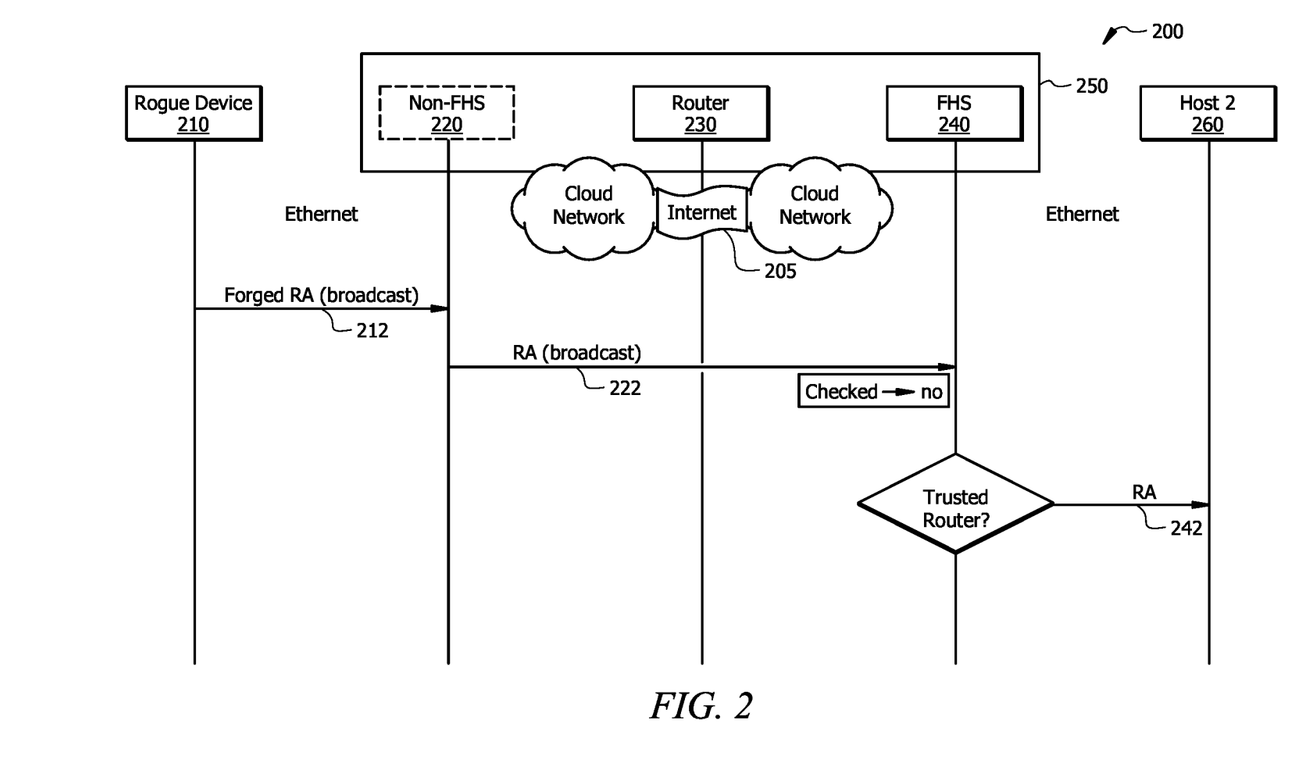
FIG. 2 illustrates a second example use case of a system for first hop security in multi-site multi-vendor clouds, in accordance with certain embodiments

To illustrate the systems and methods of the present disclosure, two example use cases are illustrated in FIGS. 1 and 2. FIG. 1 depicts a system 100 for first hop security in a multi-site and multi-vendor cloud and is directed to a scenario in which a host node claims an address that already exists in the network. System 100 may include one or more devices configured with first hop security features (referred to in the present disclosure a first hop security (FHS) device). FHS refers to a suite of features designed to secure and optimize IPv6 link operations. Specifically, in a SDA or EVPN setup, FHS provides a set of services around host MAC and IPv4/IPv6 addresses, including, e.g., host learning and tracking, broadcast avoidance for address lookup and duplicate detection, security such as IP theft and MAC theft protection, and address resolution functionality. The functions of the FHS may be incorporated into routers or switches. In an embodiment, the FHS devices may comprise Switch Integrated Security Features (SISF) switches. The features of the FHS device relevant to the present disclosure will be described below. FIG. 1 shows a first FHS device 120 and a second FHS device 140 communicably connected over a cloud network 105 via one or more connecting routers 130. In an embodiment, the cloud network 105 may comprise an Internet network, an Ethernet virtual private network (EVPN), or other network operable to connect the FHS devices. Although FIG. 1 shows two FHS devices (e.g., the first FHS device 120 and the second FHS device 140), it is to be understood that the system may comprise any number of FHS devices.

The first FHS device 120 and the second FHS device 140 may be located within a security perimeter 150 of a subnet. For purposes of the present disclosure, it is to be understood that "within a security perimeter" may include inside the security perimeter or at the edge of the security perimeter. The first FHS device 120 may comprise an ingress device facing a first host 110 (shown as "Host 1" in FIG. 1), and the second FHS device 140 may comprise an egress device facing a second host 160 (shown as "Host 2" in FIG. 1). In an embodiment, the second host 160 may be a remote host. It is to be understood that the first host 110 and the second host 160 are shown for purposes of describing the particular use case of FIG. 1, and are not necessarily part of the disclosed system 100.

In operation, suppose the first host 110 desires to form a new address and transmits a Neighbor Solicitation (Duplicate Address Detection) message (also referred to as a NS(DAD) message 112) to the network, and specifically to one or more devices within the security perimeter 150. By way of example, the true owner of the address may be the second host 160. In conventional systems, the NS(DAD) message would be broadcast to all devices in the subnet, and an attacker may forge a response claiming it owns the address. In accordance with the present disclosure, however, the first FHS device 120, because it faces the first host 110, intercepts the message. The first FHS device 120 may validate the security of the message. In an embodiment, the first FHS device 120 may perform validation by creating a binding state associated with the message. The binding state is maintained only if the first host 110 owns the address. The first FHS device 120 may check whether the address already exists in the network for a different owner, in which case it prevents the rogue from stealing the address by blocking the IPv6 ND/IPv4 ARP advertisement for which there is not a validated binding. Once the message is validated and/or the binding state is created, the first FHS device 120 may sign the message to prove validation.

The signature generated by the first FHS device 120 provides proof that the message has been validated. The signature may comprise a Crypto-ID Parameters Option (CIPO) and a Neighbor Discovery Protocol Signature Option (NDPSO), as those terms are defined in RFC 8928. The signature may also comprise a time stamp and a shared secret, as further described below. The message may be signed with a private key and a public key associated with the first FHS device 120. Unlike the methodology of RFC 8928, there is no requirement for registration, and hence, no added EARO. Thus, the EARO length in CIPO may be set to the least significant byte of the IPv6 payload length. Similarly, in contrast to the challenge/response flow of RFC 8928, the mechanism of the present disclosure does not include a challenge.

In an embodiment, the signature may be based on the Crypto-Type chosen by the first FHS device 120 and may be generated in the following manner. First the message to be signed may be formed by concatenating the following byte-strings in the order listed: 1) the 127-bit Message Type tag (as set forth in RFC 3972) in network byte order; 2) the CIPO; 3) the IPv6 packet as received; 4) a time stamp rounded to one second, e.g., in IEEE 1588 Timestamp Format; 5) a shared secret; 6) an optional nonce generated by the first FHS device 120 for this message; and 7) the 2-byte payload length of the IPv6 message as received. A signature algorithm, as specified by the chosen Crypto-Type, may be applied using the private key.

In an embodiment, the shared secret may be provisioned on (i.e., known by) the trusted FHS devices within the security perimeter 150. In FIG. 1, the trusted FHS devices include the first FHS device 120 and the second FHS device 140. The shared secret, when included in the signed message, may provide proof that the first FHS device 120 has generated the signature. In an embodiment, the shared secret is not sent in the clear in the signed message. In other words, the shared secret is sent in an encrypted manner, such that it cannot be identified by rogue devices. In an embodiment, the shared secret avoids the use of public key infrastructure (PKI) and associated mechanisms. Thus, while each FHS device may have its own key pair, the present disclosure avoids Certificate Authority (CA) or a key installation system. The keys may be formed by the FHS devices for their own purposes.

In an embodiment, the time stamp may be added to the signed message to avoid replay attacks. Specifically, since there is no challenge, the signed message may potentially be replayed by an attacker; the time stamp prevents such use.

In an embodiment, and for certain applications, the optional nonce may be added to the signed message. In another embodiment, the function of the nonce may be implicit in the shared secret. Specifically, if the first FHS device 120 (the ingress node) uses a shared secret or a value derived from a shared secret along with a time stamp (e.g., by hashing them together), the nonce may be omitted in the message from ingress to egress. In certain embodiments, the nonce may still be included in the message in which case the shared secret is added implicitly to the crypto computation in addition to the pair of nonces. The egress node nonce is always present in the response in a nonce option. When both are present, the combination is guaranteed to be unique. If the ingress nonce was omitted, the egress node's IP address may be combined with its nonce in the crypto computation to ensure that the resulting string is unique.

Once the first FHS device 120 signs the message, it may transmit the message (shown in FIG. 1 as the NS(DAD) with CIPO and NDPSO message 122) to one or more FHS devices in the security perimeter, as required by particular applications. In the scenario depicted in FIG. 1 (where the first host 110 desires to form a new address), the first FHS device 120 may send the signed message to all of the FHS devices in the subnet or in the security perimeter 150 to determine whether the address already exists. Thus, the signed message may also be sent to the second FHS device 140 which faces the second host 160 (i.e., the actual owner of the address).

The second FHS device 140 receives the signed message having, inter alia, the CIPO, NDPSO, and the shared secret, and thus understands the message to be coming from a trusted device. The second FHS device 140 may then remove the CIPO and the NDPSO, recompute the payload length, and check that the resulting payload length matches the value in the CIPO, and if so, rebuild the concatenated data and verify the signature with the public key in the CIPO. The second FHS device 140 may then determine whether any of the hosts or devices which it faces owns the address requested by the first host 110 (or owns a binding state corresponding to the binding state generated for the message of the first host 110). If the second FHS device 140 does not identity hosts or devices corresponding to the requested address (i.e., there are no conflicts), no response is required by the second FHS device 140 to the first FHS device 120. However, if the second FHS device 140 identifies a host or device having an address corresponding to the requested address (i.e., there is conflict), the second FHS device 140 may transmit the NS(DAD) message (shown in FIG. 1 as the NS(DAD) message 142) to the second host 160 via unicast. The second host 160 may respond by transmitting a Neighbor Advertisement (Override) (NA(O)) message 162 back to the second FHS device 140, confirming that it is indeed the owner of the requested address.

The second FHS device 140 may undertake the same series of steps to respond to the first FHS device 120. Specifically, the second FHS device 140 may validate the security of the NA(O) message 162 received from the second host 160, sign the message with a signature to prove validation of the message (the signature comprising, e.g., a CIPO, a NDPSO, a shared secret, and a time stamp), and then transmit the resulting message (shown in FIG. 1 as the NA(O) with CIPO and NDPSO message 144) to the first FHS device 120 over the cloud network 105. The first FHS device 120 may validate the signature as coming from a trusted FHS device, thereby accepting the message 144. The first FHS device 120 may then remove the CIPO and the NDPSO, recompute the payload length, and check that the resulting payload length matches the value in the CIPO, and if so, rebuild the concatenated data and verify the signature with the public key in the CIPO. The first FHS device 120 may then pass the NA(O) message 124 to the first host 110, with the effect to deny the address, as expected under DAD.

In this manner, the system 100 of the present disclosure provides a mechanism whereby trusted FHS devices are able to ensure that genuine NA(O) messages pass through, while forged messages are dropped. As a result, the present disclosure provides an extension to RFC 8928, so that FHS devices (routers and switches) residing within a security perimeter may ascertain the security of messages being passed through the security perimeter.

Reference is now made to FIG. 2, wherein is shown a second example system 200 for first hop security in a multi-site and multi-vendor cloud and is directed to a scenario in which an attacker may attempt to forge a Router Advertisement (RA) message. System 200 may include one or more devices configured with FHS features (e.g., first hop security (FHS) devices). The functions of the FHS may be incorporated into a router or a switch. FIG. 2 shows a non-FHS device 220 (a router or switch not having FHS functionality) and a FHS device 240 communicably connected over a cloud network 205 via one or more connecting routers 230. In an embodiment, the cloud network 205 may comprise an Internet network, an Ethernet virtual private network (EVPN), or other network operable to connect the devices.

The non-FHS device 220 and the FHS device 240 may be located within a security perimeter 250 of a subnet. For purposes of the present disclosure, it is to be understood that "within a security perimeter" may include inside the security perimeter or at the edge of the security perimeter. The non-FHS device 220 may comprise an ingress device facing a first remote host 210, which for purposes of FIG. 2 may comprise a rogue device. The FHS device 240 may comprise an egress device facing a second remote host 260. It is to be understood that the first remote host 210 and the second remote host 260 are shown for purposes of describing the particular use case of FIG. 2, and are not necessarily part of the disclosed system 200.

In operation, suppose the first remote host 210 (rogue device) forges an Router Advertisement (RA) message and transmits the forged RA message (shown as message 212 in FIG. 2) to one or more devices in the security perimeter 250, including the non-FHS device 220. The non-FHS device 220 may broadcast the forged RA message (shown as message 222 in FIG. 2) to one more FHS devices, such as FHS device 240 in the security perimeter 250. The FHS device 240 receives the message and determines that it is not signed and therefore does not trust it. The FHS device 240 may then apply an action based on policy. For example, the FHS device 240 may drop the RA message altogether (not shown) because it is not coming from a trusted FHS device. Alternatively, it may drop the RA message selectively, e.g., wherein the FHS device 240 performs a table lookup to determine the source address of the first remote host 210 transmitting the RA message. Based on the source address, the FHS device 240 may determine if the first remote host 210 is trusted and whether the message may be forwarded to the appropriate host, here, the second remote host 260 (shown as message 242 in FIG. 2). In an embodiment, the FHS device 240 may also use an application to validate that the first remote host 210 provides actual services, thereby triggering captive portal detection that uses the router and checks access to external services.

The use cases of FIGS. 1 and 2 are example scenarios in which the systems and methods of the present disclosure may be used. It is to be understood, however, that the present disclosure is not intended to be limited to the specific uses cases described. It is contemplated that the systems, methods, and mechanisms described in the present disclosure may be applicable in any number of scenarios in which FHS devices (i.e., devices equipped with FHS functionality) may be configured to secure a security perimeter and protect against potential attacks from the trunk in a multi-vendor cloud. Specifically, by allowing a mechanism that enables trusted FHS devices to validate and sign messages that enter the security perimeter, where appropriate, and send the validated and signed messages to other FHS devices, a trusted environment may be provisioned in a multi-vendor deployments.

Figure 3:
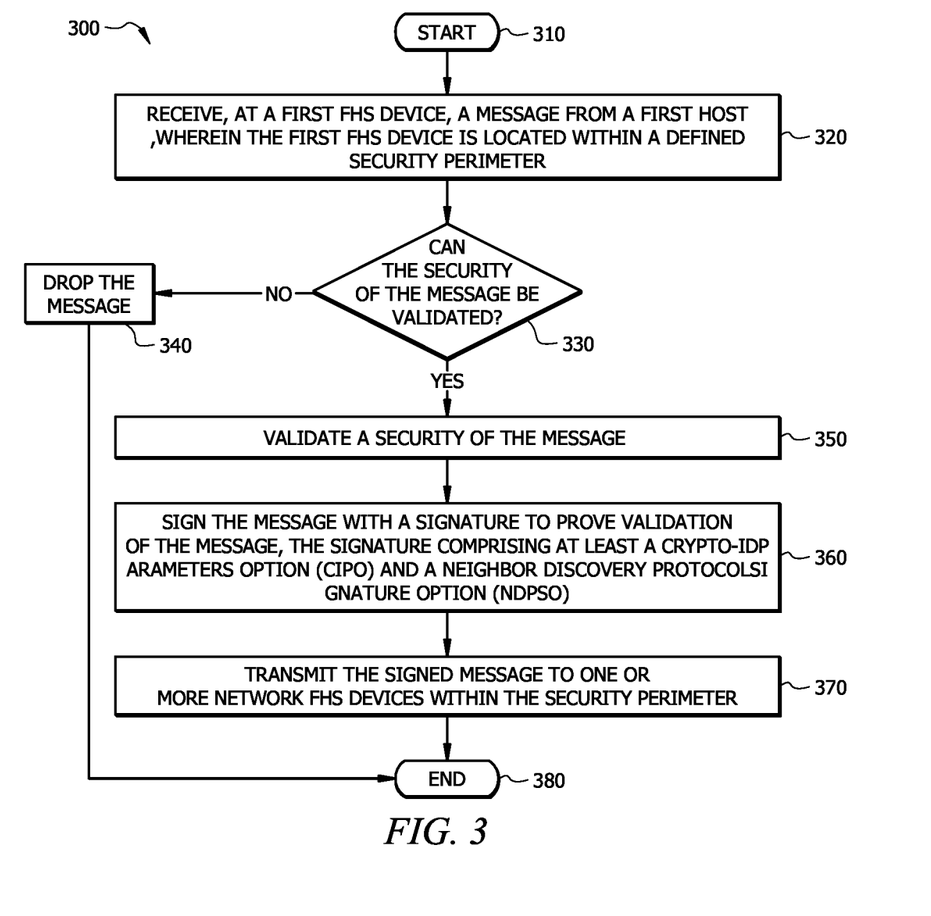
FIG. 3 illustrates a flow diagram of a method for first hop security in multi-site multi-vendor clouds, in accordance with certain embodiments.

Reference is now made to FIG. 3, wherein is shown a flow diagram of a method 300 for first hop security in a multi-site and multi-vendor cloud, in accordance with the present disclosure. The steps of the method 300 may be generally in accord with the mechanisms and operations outlined in conjunction with the systems 100 and 200 of FIGS. 1 and 2, respectively. As such, similar and corresponding terms described in conjunction with FIGS. 1 and 2 may have the same meaning when used in conjunction with the method 300 of FIG. 3. Additionally, the present disclosure incorporates by reference the description of FIGS. 1 and 2 for the purposes of explaining, expounding upon, or otherwise clarifying the steps of the method 300.

The method 300 may be performed in any network environment, and may particularly be suitable for multi-site and/or multi-vendor deployments in an EVPN cloud. The method 300 presumes that FHS devices, e.g., switches or routers, are configured with FHS functionality (as described above). The FHS devices may be located within a security perimeter of a subnet. For purposes of the present disclosure, it is to be understood that "within a security perimeter" may include inside the security perimeter or at the edge of the security perimeter. While the steps of method 300 may be performed from the perspective of a FHS device, it is to be understood that method 300 may be performed by any component, element, or module capable of performing the described functions.

Method 300 may begin at step 310. At step 320, a first FHS device located within the defined security perimeter may receive a message from a first host. In an embodiment, the message may be a IPv6 message. In an embodiment, the message received from the first host may be associated with the formation of a new address and may comprise a Neighbor Solicitation (Duplicate Address Detection) message.

At step 330, the first FHS device may make a determination as to whether the security of the message may be validated. If, at step 330, it is determined that the security of the message cannot be validated, the method 300 may proceed to step 340. At step 340, the message may be dropped, and at step 380, the method may end. If, however, at step 330, it is determined that the security of message can be validated, the method 300 may proceed to step 350, wherein validation of the security of the message is carried out. In an embodiment, the step of validating the message may comprise creating a binding state associated with the message. The binding state may be maintained only if the first host owns the address. The first FHS device may check whether the address already exists in the network for a different owner, in which case it prevents the rogue from stealing the address by blocking the IPv6 ND/IPv4 ARP advertisement for which there is not a validated binding.

At step 360, the first FHS device may sign the message with a signature to prove validation of the message. The signature may comprise at least a Crypto-ID Parameters Option (CIPO) and a Neighbor Discovery Protocol Signature Option (NDPSO). The signature may also comprise a time stamp and a shared secret, as further described below. The message may be signed with a private key and a public key associated with the first FHS device.

In an embodiment, the signature may be based on the Crypto-Type chosen by the first FHS device and may be generated in the following manner. First the message to be signed may be formed by concatenating the following byte-strings in the order listed: 1) the 127-bit Message Type tag (as set forth in RFC 3972) in network byte order; 2) the CIPO; 3) the IPv6 packet as received; 4) a time stamp rounded to one second, e.g., in IEEE 1588 Timestamp Format; 5) a shared secret; 6) an optional nonce generated by the first FHS device; and 7) the 2-byte payload length of the IPv6 message as received. A signature algorithm, as specified by the chosen Crypto-Type, may be applied using the private key.

In an embodiment, the shared secret may be provisioned on (i.e., known by) the trusted FHS devices within the security perimeter. The shared secret, when included in the signed message, may provide proof that the first FHS device has generated the signature. In an embodiment, the shared secret is not sent in the clear in the signed message, i.e., the shared secret is sent in an encrypted manner, such that it cannot be identified by rogue devices. In an embodiment, the shared secret avoids the use of public key infrastructure (PKI) and associated mechanisms. Thus, while each FHS device may have its own key pair, the present disclosure avoids Certificate Authority (CA) or a key installation system. The keys may be formed by the FHS devices for their own purposes.

In an embodiment, the time stamp may be added to the signed message to avoid replay attacks. Specifically, since there is no challenge, the signed message may potentially be replayed by an attacker; the time stamp prevents such use.

In an embodiment, and for certain applications, the optional nonce may be added to the signed message. In another embodiment, the function of the nonce may be implicit in the shared secret.

At step 370, the first FHS device may transmit the signed message to one or more network FHS devices within the security perimeter. The network FHS device receives the signed message having, inter alia, the CIPO, NDPSO, the shared secret, and the time stamp (and the optional nonce), and thus understands the message to be coming from a trusted device. The network FHS device may then remove the CIPO and the NDPSO, recompute the payload length, and check that the resulting payload length matches the value in the CIPO, if so, rebuild the concatenated data and verify the signature with the public key in the CIPO. The network FHS device may then act on the message, as appropriate for the given application or scenario (as described by way of example in conjunction with FIGS. 1 and 2).

For example, if the message required a response to the first FHS device, the network FHS device may undertake the same series of steps to respond to the first FHS device by, e.g., validating the security of the message it is to transmit to the first FHS device, sign the message with a signature to prove validation of the message (the signature comprising, e.g., a second CIPO, a second NDPSO, a second shared secret, and a second time stamp, the term "second" used to differentiate these elements from the CIPO, NDPSO, the shared secret and time stamp used by the first FHS device), and then transmit the resulting message to the first FHS device. Based on the signature, the first FHS device may validate the signature as coming from a trusted FHS device, thereby accepting the message.

At step 380, the method may end.

In sum, the present disclosure provides for systems and methods whereby FHS devices (i.e., devices equipped with FHS functionality) may be configured to secure a SD Access security perimeter and protect against potential attacks from the trunk in a multi-vendor EVPN cloud. By allowing a mechanism that enables trusted FHS devices to validate and sign messages that enter the security perimeter on the fly, and send the validated and signed messages to other FHS devices, a trusted environment may be provisioned in a multi-vendor and/or multi-site deployments.

Figure 4:
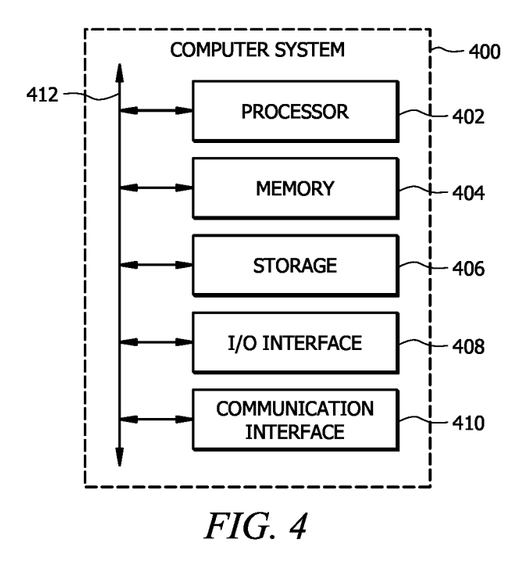
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media comprising instructions that, when executed by the one or more processors, cause one or more components of the system to perform operations comprising:
receiving, at a first hop security (FHS) device located within a defined security perimeter, a message from a first host;
validating a security of the message;
signing the message with a signature to prove validation of the message, the signature comprising at least a Crypto-ID Parameters Option (CIPO) and a Neighbor Discovery Protocol Signature Option (NDPSO); and
transmitting the signed message to one or more network FHS devices within the security perimeter.

2. The system of claim 1, wherein the operation of validating comprises creating a binding state associated with the message.

3. The system of claim 1, wherein the message is signed based on a Crypto-type associated with the FHS device.

4. The system of claim 1, wherein the signed message further comprises a shared secret known by the FHS device and the one or more network FHS devices within the security perimeter.

5. The system of claim 1, the operations further comprising:
adding a time stamp to the signed message.

6. The system of claim 1, the operations further comprising:
adding an optional nonce to the signed message.

7. The system of claim 1, the operations further comprising:
receiving from at least one of the one or more network FHS devices a second signed message, the second signed message including at least a second CIPO and a second NDPSO.

8. A method, comprising:
receiving, at a first hop security (FHS) device located within a defined security perimeter, a message from a first host;
validating a security of the message;
signing the message with a signature to prove validation of the message, the signature comprising at least a Crypto-ID Parameters Option (CIPO) and a Neighbor Discovery Protocol Signature Option (NDPSO); and
transmitting the signed message to one or more network FHS devices within the security perimeter.

9. The method of claim 8, wherein the step of validating comprises creating a binding state associated with the message.

10. The method of claim 8, wherein the message is signed based on a Crypto-type associated with the FHS device.

11. The method of claim 8, wherein the signed message further comprises a shared secret known by the FHS device and the one or more network FHS devices within the security perimeter.

12. The method of claim 8, further comprising the step of:
adding a time stamp to the signed message.

13. The method of claim 8, further comprising the step of:
adding an optional nonce to the signed message.

14. The method of claim 8, further comprising the step of:

receiving from at least one of the one or more network FHS devices a second signed message, the second signed message including at least a second CIPO and a second NDPSO.

15. One or more computer-readable non-transitory storage media embodying instructions that, when executed by a processor, cause the performance of operations comprising:

receiving, at a first hop security (FHS) device located within a defined security perimeter, a message from a first host;

validating a security of the message;

signing the message with a signature to prove validation of the message, the signature comprising at least a Crypto-ID Parameters Option (CIPO) and a Neighbor Discovery Protocol Signature Option (NDPSO); and transmitting the signed message to one or more network FHS devices within the security perimeter.

16. The one or more computer-readable non-transitory storage media of claim 15, wherein the operation of validating comprises creating a binding state associated with the message.

17. The one or more computer-readable non-transitory storage media of claim 15, wherein the message is signed based on a Crypto-type associated with the FHS device.

18. The one or more computer-readable non-transitory storage media of claim 15, wherein the signed message further comprises a shared secret known by the FHS device and the one or more network FHS devices within the security perimeter.

19. The one or more computer-readable non-transitory storage media of claim 15, the operations further comprising:

adding a time stamp to the signed message.

20. The one or more computer-readable non-transitory storage media of claim 15, the operations further comprising:

adding an optional nonce to the signed message.

\* \* \* \* \*